Nov. 3, 1959 W. D. ALLISON 2,911,231
LOAD COMPENSATING SPRING SUSPENSION FOR VEHICLES
Filed Oct. 11, 1957 3 Sheets-Sheet 1
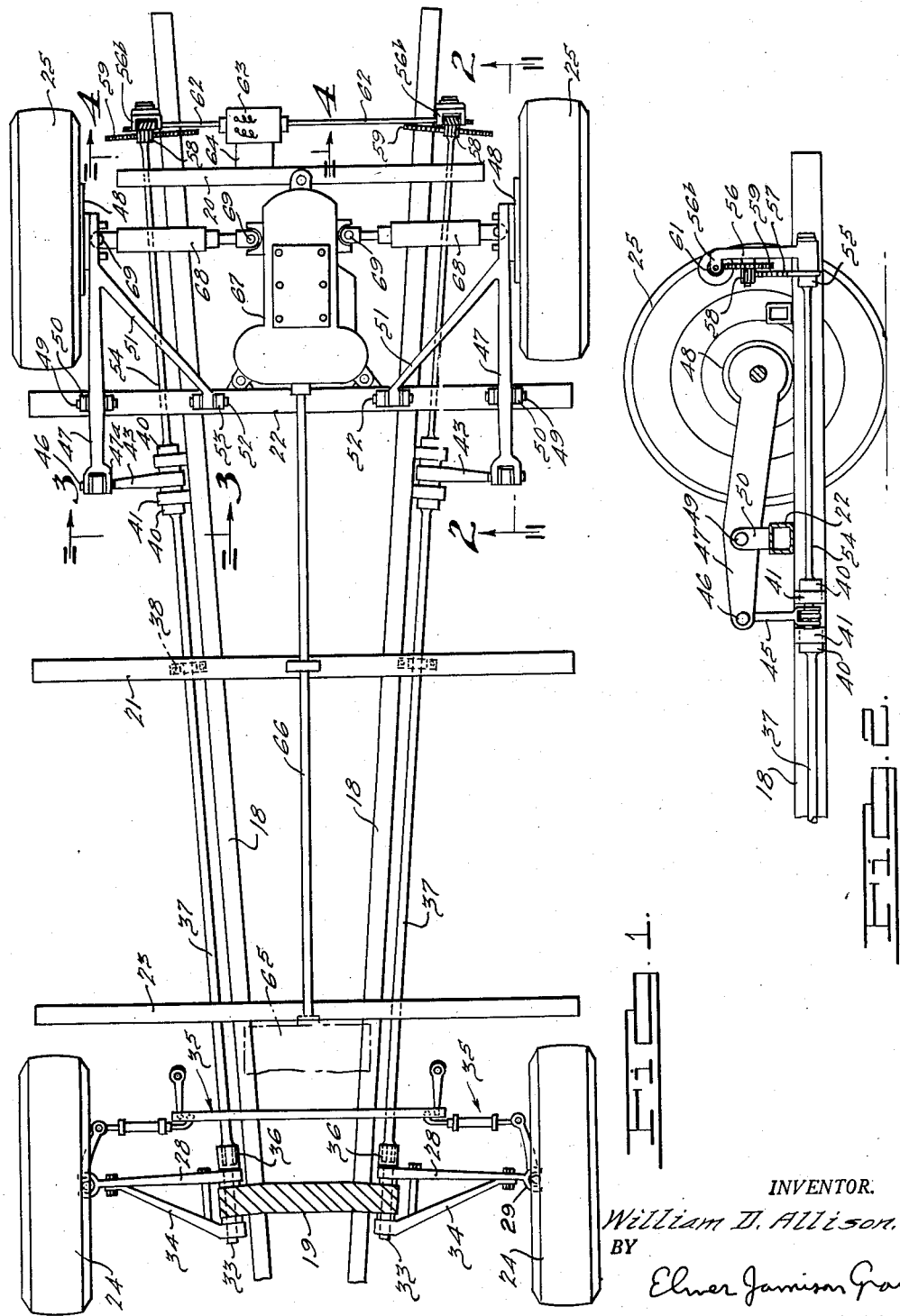
INVENTOR.
William D. Allison.
BY
Elmer Jamison Gray
ATTORNEY.

Nov. 3, 1959     W. D. ALLISON     2,911,231
LOAD COMPENSATING SPRING SUSPENSION FOR VEHICLES
Filed Oct. 11, 1957     3 Sheets-Sheet 2
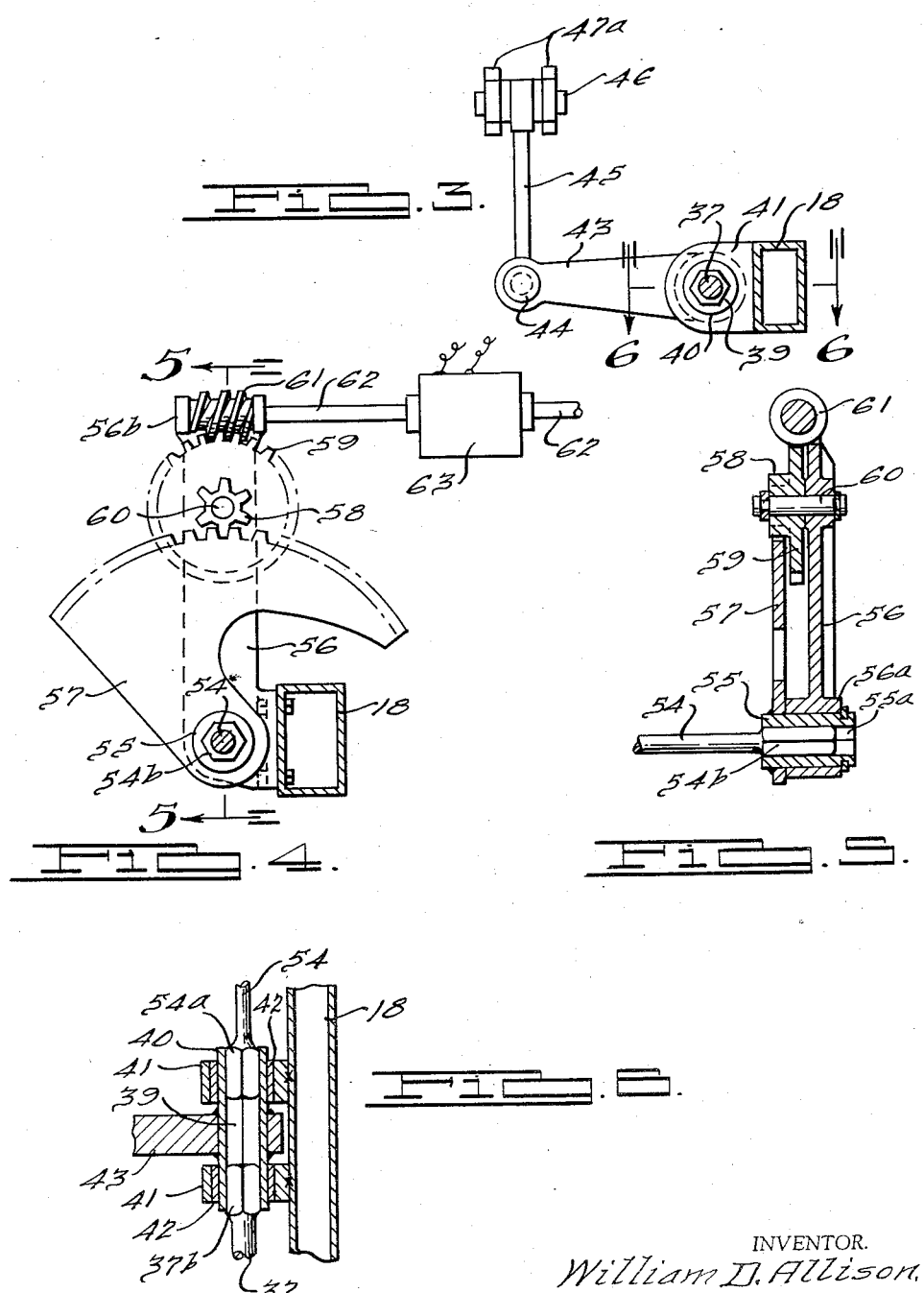
INVENTOR.
William D. Allison,
BY
Elmer Jamieson Gray
ATTORNEY.

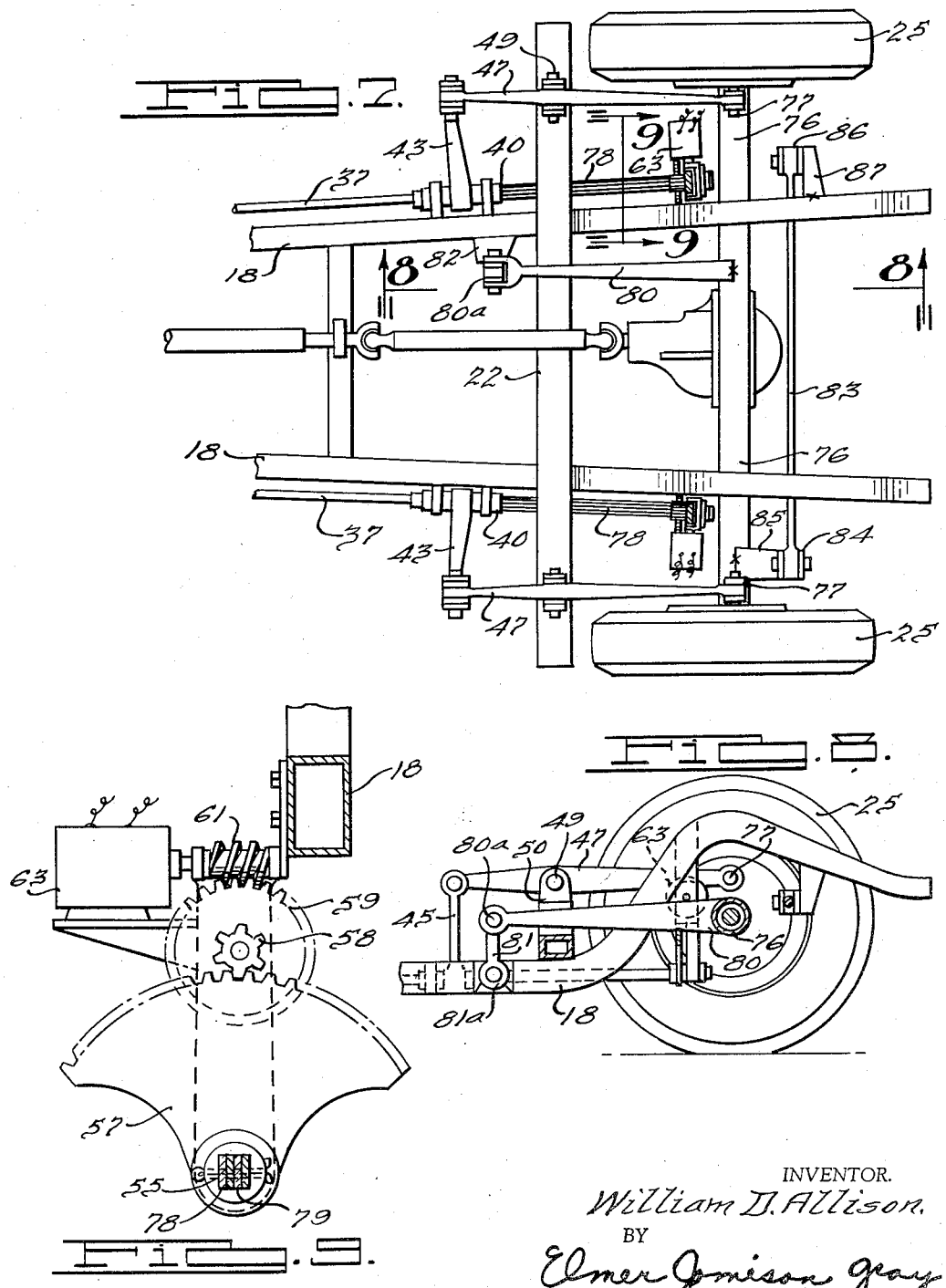

United States Patent Office 2,911,231
Patented Nov. 3, 1959

2,911,231

LOAD COMPENSATING SPRING SUSPENSION FOR VEHICLES

William D. Allison, Grosse Pointe Farms, Mich.

Application October 11, 1957, Serial No. 690,183

20 Claims. (Cl. 280—104)

This invention relates to motor vehicles and particularly to improvements in the spring suspensions therefor. The invention is applicable to various types of motor vehicles such as automobiles of the pleasure or passenger types, busses, trucks, ambulances and commercial vehicles. For the purpose of illustration the invention has been shown herein as embodied in a motor vehicle having a chassis adapted to be utilized in a passenger or pleasure type automobile.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles, particularly those equipped with conventional solid axle rear suspensions.

Another important object of the invention is to provide a simplified and improved spring suspension especially advantageous for use in light cars, the invention enabling a light relatively cheap car to be produced which will have riding characteristics at least comparable to or superior to those of relatively heavy, long wheel base cars of expensive makes.

Another object of the invention is to provide an improved spring suspension for a motor vehicle having front and rear wheels comprising a main spring means, preferably torsion bar spring means, connecting a front and a rear wheel at the same side of the vehicle and adapted to transmit vertical forces in corresponding directions to the vehicle frame adjacent opposite ends thereof in response to vertical motion of either wheel. In addition to the foregoing, the spring suspension comprises a load compensating spring means, preferably of the torsion bar kind, connected to one of the wheels, such as the rear wheel, independently of the front wheel and adapted to be torsionally deflected to vary the spring resistance adjacent an end of the frame so as to compensate for varying loads thereon. As a result of this feature of the invention it is possible to maintain the average effective riding height of the vehicle body substantially constant within the range of the load capacity of the spring suspension regardless of whether the vehicle is empty or whether varying loads are carried thereby. Moreover, by virtue of the main spring suspension which is common to the front and rear wheels much softer or lower rate springs may be utilized, thereby improving the riding qualities of the vehicle.

In the illustrated embodiment of the invention the main torsion bar spring means, which may be a single bar of solid or tubular construction, is connected directly to the inner end of the lower swinging suspension arm for the front wheel. This bar preferably extends continuously and rearwardly to its connection with the rear wheel at the same side of the vehicle, this construction having the additional advantage of resisting body roll or side sway. The rear end of the main torsion bar spring means, in the illustrated embodments is attached to a swinging lever arm adjacent the inner end thereof, and this lever arm is adapted to be swung in opposite directions, preferably up and down, to torsionally twist or deflect the torsion bar spring means by means of a swinging torque arm or wheel supporting lever connected to the rear wheel so as to be responsive to vertical motion thereof.

In the illustrated embodiments the rear wheels are either independently sprung or connected by an axle. In certain instances a longitudinally extending lever or torque arm is attached at its rear end either to the wheel or the axle, as the case may be, this lever or arm being pivoted or trunnioned intermediate its ends on the frame and having its forward end connected to the outer end of the aforesaid lever arm which is attached at its inner end to the main torsion bar spring means. By virtue of this construction up and down movement of the rear wheel or wheel axle will torsionally deflect the main torsion bar spring means in directions opposite to the torsional deflection thereof produced by corresponding up and down movements of the front wheel. The load compensating spring means, which is preferably of the torsion bar kind, extends longitudinally in line with the main torsion bar spring means at each side of the vehicle, and one end of the compensating spring means is connected to the same lever arm as the main spring means. In order to vary the spring resistance of the load compensating spring means there is preferably provided power driven means for torsionally deflecting one end of the compensating spring means.

Other objects of this invention will appear in the following description and appended claims, reference being had to the accompanying drawings forming a part of this specification wherein like reference characters designate corresponding parts in the several views.

This application is a continuation-in-part of my copending application Serial No. 240,940, filed August 8, 1951, and now abandoned.

Fig. 1 is a fragmentary plan view, partly in section, of a motor vehicle chassis provided with a spring suspension constructed in accordance with one embodiment of the invention.

Fig. 2 is a fragmentary sectional elevation taken substantially through lines 2—2 of Fig. 1 looking in the direction of the arrows.

Fig. 3 is an enlarged transverse sectional elevation taken substantially through lines 3—3 of Fig. 1 looking in the direction of the arrows.

Fig. 4 is an enlarged transverse sectional elevation taken substantially through lines 4—4 of Fig. 1 looking in the direction of the arrows.

Fig. 5 is a fragmentary section taken substantially through lines 5—5 of Fig. 4 looking in the direction of the arrows.

Fig. 6 is a fragmentary sectional view taken substantially through lines 6—6 of Fig. 3, looking in the direction of the arrows.

Fig. 7 is a fragmentary plan view of the rear end of a motor vehicle chassis provided with a spring suspension constructed in accordance with another embodiment of the present invention.

Fig. 8 is a fragmentary vertical section taken substantially through lines 8—8 of Fig. 7 looking in the direction of the arrows.

Fig. 9 is an enlarged transverse sectional elevation taken substantially through lines 9—9 of Fig. 7 looking in the direction of the arrows.

Before explaining in detail the present invention it is to be understood that the invention is not limited in its application to the details of the construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings, there is illustrated, by way of example, a vehicle chassis having road wheels supporting the chassis frame or body through the medium of a spring suspension which, in the several embodiments, is preferably of the torsion bar kind. The rear wheels in one embodiment are shown as independently sprung and in other embodiments the rear wheels are mounted upon a conventional solid axle. In the interest of clarity the vehicle super-structure or body and details of the power plant and driven mechanisms have been omitted in the drawings.

As illustrated in the drawings, the chassis or body frame is shown, by way of example, as comprising spaced longitudinal sills or frame members 18 of boxlike tubular construction rigidly connected together by means of a main drop type front cross member 19, a rear cross member 20, and intermediate cross members 21, 22 and 23. The vehicle is provided with a pair of front dirigible wheels 24 and a pair of rear driven wheels 25.

Each front wheel 24 is supported in generally conventional manner by means of upper and lower short and long swinging suspension arms or levers which are preferably of wish-bone construction, the relatively long lower suspension arms for the front wheels being indicated at 28. The upper and lower suspension arms for each front wheel are mounted generally at right angles to the longitudinal axis of the vehicle for swinging movement in a substantially vertical plane and are joined together at their outer ends by a spindle and king pin mounting 29 of suitable type. The outer end of each lower suspension arm 28 is pivoted to the spindle and king pin mounting or carrier 29 and the inner end is pivotally mounted at 33 (Fig. 1) upon the cross member 19. The main lower suspension arm 28, as shown in Fig. 1, is braced by means of a brace bar 34 which is preferably detachably bolted to the arm 28. The inner ends of the members 28 and 34, forming the lower suspension arm unit, are pivotally mounted upon a shaft or spindle 33 extending through the cross frame member 19 and rigidly secured to the latter, as by welding. Suitable bearings are interposed between the inner ends of the arm members 28, 34 and pivot shaft 33, thus permitting each lower suspension arm to swing up and down in response to up and down motion of the associated front wheel.

Steering control is provided at the front wheels 24 through the spindle and king pin mountings or carriers 29 by any conventional type of steering mechanism, such as that generally illustrated, by way of example, at 35 in Fig. 1.

Rigidly secured, as by welding, to the inner end of each lower suspension arm 28 is a sleeve 36 formed interiorly thereof with a hex socket into which the forward enlarged hex end of a main torsion bar 37 has a sliding fit. Thus, the front end of each torsion bar 37 is keyed to the sleeve 36 which in turn is rigidly secured to the lower suspension arm 28 at the axis of swinging thereof. In the present embodiments each main longitudinal torsion bar 37 extends from the sleeve 36 rearwardly alongside and outwardly of one of the main frame members 18. Intermediate the length thereof each main torsion bar 37 may extend through and be guided by rubber bushings mounted within brackets 38 detachably secured to the cross frame member 21.

Referring to Figs. 1, 3 and 6, the rear end of each main torsion bar 37 is formed with an enlarged hex portion 37b which has a sliding fit within a correspondingly shaped socket 39 extending from one end to the other in a sleeve 40. This sleeve is rotatably mounted or journalled within spaced brackets 41 through the medium of suitable bushings 42, the brackets being rigidly secured to the adjacent frame member 18, as by welding. A laterally extending lever arm 43 for each rear wheel 25 has an opening at its inner end through which the sleeve 40 extends, the sleeve being rigidly secured to the lever arm as by welding.

It will be seen that the lever arm 43 for each rear wheel extends outwardly from the longitudinal axis of the associated main torsion bar 37. The outer end of each lever arm 43 is pivotally connected at 44 to the lower bifurcated end of a vertically extending connecting rod or link 45. Rubber bushings are preferably interposed between the link 45 and lever arm 43 to provide a flexible pivotal connection at 44. The upper end of the link or connecting rod 45 is pivotally connected at 46 to the forward bifurcated end 47a of a swinging rear wheel carrying lever or torque arm 47. A suitable rubber bushing is preferably interposed between the lever 47 and the upper end of the link 45 to provide a flexible pivotal connection at 46.

The wheel carrying lever or torque arm 47 for each rear wheel 25 is rigidly attached at its rear end to a rear wheel support and spindle member 48. Each lever or torque arm 47 is fulcrumed or pivoted intermediate its ends at 49 to a bifurcated bracket 50 rigidly attached to an end of the frame cross member 22. As illustrated in Fig. 1, each rear wheel carrying lever 47 may be braced by means of an angularly extending brace bar 51 which is pivoted at its forward end at 52 to an upstanding bifurcated bracket 53 rigidly attached to the frame cross member 22.

In the present embodiment of the invention each main torsion bar 37 is supplemented at the rear of the vehicle by means of a compensating torsion bar 54 at each side of the vehicle for the purpose of additionally springing the rear wheels and providing means for compensating for varying static loads. The compensating torsion bars 54, two being provided in the present embodiment, as in the case of the main torsion bars 37, are selected as to cross sectional size and torsional characteristics to suit the particular vehicle, and function to increase or decrease the spring resistance at the rear of the vehicle so as to maintain the rear end of the vehicle at a substantially constant average riding height. The load compensating bars 54 are shown in the present instance for the rear end of the vehicle only since in present-day automobiles most of the passenger and baggage loads are concentrated at the rear. However, it will be understood that where loads are distributed substantially evenly to the front and rear wheels the bars 54 may be duplicated for the front wheels and operated in the same manner as hereinafter described or as disclosed in my Patent No. 2,607,610.

Each load compensating bar 54 is preferably of smaller diameter than the associated main torsion bar 37 and, as illustrated in Fig. 6, is provided at its forward end with an enlarged hex portion 54a having a snug sliding fit within the correspondingly shaped socket 39 in the rear end of the sleeve 40. It will thus be seen that the main and supplementary torsion bars 37 and 54, respectively, extend end to end and in alignment, and adjacent ends thereof are keyed within a common sleeve or tubular member 40 which is rigidly secured to the inner end of one of the up and down swinging lever arms 43. As shown in Figs. 4 and 5, the rear end of each compensating bar 54 is formed with an enlarged hex portion 54b having a snug sliding fit within a correspondinly shaped hex socket 55a in a sleeve or socket member 55. This socket member 55 is rotatably mounted within a bearing sleeve portion 56a on the lower end of a bracket 56 bolted to one of the frame members 18. The lower hub portion of a sector gear 57 is rigidly attached, as by welding, to the socket member 55. Meshing with the teeth of the gear 57 is a pinion 58 which is integral with a larger worm gear 59. The reduction gear unit 58, 59 is rotatably mounted upon a shaft 60 journalled in the upper portion of the bracket 56. This bracket terminates at its upper end in a bifurcated portion 56b receiving a worm 61 meshing with the teeth of the worm gear 59. The worm 61 is attached to a shaft 62 driven by a small reversible electric motor 63 carried by a bracket 64 (Fig. 1) attached to the cross frame member 20. It will be understood that an operating unit, including gears 57—59, worm 61 and shaft 62, is provided for each compensating torsion bar 54 at each side of the vehicle and each operated from the electric motor 63. Since the worms 61 of the operating units for the two compensating bars 54 have oppositely directed teeth, the sector gears 57 will be rotated in opposite directions upon operation of the motor 63 in one direction or the other. Operation of the electric motor, through power supplied from the battery of the vehicle, will, through the operating units, turn the sleeves 55 in opposite directions, and since these sleeves are splined to the rear ends of the torsion bars 54 the latter will be torsionally deflected or twisted in one direction or the other. The worms 61 meshing with the worm teeth on the gears 59 provide a self-locking construction in which the sector gears are locked in any angularly adjusted position thereof. As a result of this construction the compensating torsion bars 54 may be simultaneously adjusted torsionally in opposite directions in a positive manner to any degree of deflection desired and will be maintained in every adjusted position by the self-locking worms 61.

As illustrated by way of example in Fig. 1, the rear wheels may be driven through the medium of a suitable engine, such as a V-type engine 65, mounted at the front ends of the frame members 18. The engine drives a propeller shaft 66 which is connected at the rear end thereof to the transmission and differential mechanism carried by a casing 67 mounted upon the rear cross members 20 and 22. Vertically oscillatable drive shafts 68 are connected through universal joints 69 to the differential mechanism and driven wheels 25. The foregoing construction, with the transmission arranged at the rear of the vehicle, permits the use of a single straight propeller shaft 66 requiring no universal joints in its length and also permits better distribution of weight at the front and rear of the frame.

From the foregoing it will be seen that up and down motion of the rear wheels 25 will result in rocking or swinging the wheels supporting levers or torque arms 47 about a common transverse pivotal axis extending through the pivots 49, 52 of the levers on the frame cross member 22. The forward ends of the levers 47 will move vertically in directions opposite to the wheels 25 and this vertical motion of the forward ends of these levers will be transmitted through the connecting links 45 to the lever arms 43, thereby swinging or rocking the same up and down about the inner pivotal axes thereof extending through the tubular sleeves 40. As a result of the up and down motion of each lever arm 43, the torsional deflection of the associated torsion bars 37 and 54 will be varied, thereby varying the spring resistance at the rear wheel. Since the main torsion bars 37 are common to the front and rear wheels it will be apparent that the spring rate of these torsion bars will be substantially half the spring rates required for conventional vehicles having independent springs for all four wheels.

Since in the present embodiment the forward ends of the main torsion bars 37 are attached to the inner ends of the lower suspension arms 28 for the front wheels, it will be apparent that up and down motion of these wheels will result in torsionally deflecting the bars 37 in opposite directions. Although the levers or arms 28 and 43 attached to opposite ends of each torsion bar 37 extend outwardly from the torsion bar in the same direction, it will be noted that by virtue of lever 47 up and down movement of a rear wheel will torsionally deflect the main torsion bar 37 in directions opposite to the torsional deflection thereof produced by corresponding up and down movements of the front wheel at the same side of the vehicle. As a consequence, either arm or lever 28 or 43 is effective to torsionally deflect the torsion bar 37 in opposition to the other arm or lever, thereby to transmit vertical forces in corresponding directions to the frame at opposite ends thereof in response to vertical motion of either wheel. Thus, when a rear wheel 25 is displaced upwardly, thereby tending to elevate the rear end of the frame, the rear end of the bar 37 will be twisted in a direction so as to exert a force tending to swing the front suspension arm 28 downwardly and depress the front wheel. Since the outer end of the suspension arm 28 is held against downward movement by the front wheel the net result is to raise the front end of the frame in a direction corresponding to the direction in which the rear end of the frame is raised by the upward movement of the rear wheel. The reverse operation occurs when the front wheel is displaced vertically relatively to the rear wheel at the same side of the vehicle.

From the foregoing it will be seen that both front and rear ends of each torsion bar spring 37 will be simultaneously deflected or twisted substantially in corresponding amounts when the front and rear wheels successively pass over a change in elevation, resulting in substantially equivalent vertical movements in the same directions being transmitted to opposite ends of the vehicle body and chassis. The main torsion bar spring suspension, therefore, simultaneously imparts vertical forces in corresponding directions adjacent the front and rear of the vehicle body or frame in response to vertical motion of either a front wheel or a rear wheel. As a consequence, the spring suspension will tend to maintain the chassis and vehicle body substantially level regardless of vertical movements of the front and rear wheels. Of course, it will be understood that when the front and rear wheels are simultaneously elevated both ends of the vehicle chassis and body will be raised substantially equal distances. When one front wheel is elevated and a rear wheel is lowered simultaneously, assuming the distances of elevation are equal, there will be substantially no change in lift to the vehicle sprung weight. It is important to note that the total vertical forces due to a change in elevation of either front or rear wheel at one side of the vehicle is absorbed by and divided equally between the front and rear of the interconnecting torsion bar 37. Thus, the average spring rate of the present spring suspension will be approximately one-half of the spring rate of a conventional automobile.

An important purpose of the load compensating torsion bars 54 is to increase or decrease the total load resistance of the spring suspension at the rear of the vehicle so as to compensate for increases or decreases in the total load applied at the rear of the vehicle. In order to enable the use of compensating bars 54 of minimum diameter and also to avoid any condition in which the rear end of the frame rides either above or below the normal riding height thereof, the operating means for the compensating bars is preferably constructed so as to enable each compensating torsion bar to be torsionally twisted or deflected in one direction so as to act in opposition to the associated main torsion bars when there is no load on the rear end of the vehicle additional to the normal sprung weight thereof. The main torsion bars 37, therefore, may be selected as to diameter and torsional spring capacity so as to carry a predetermined static load at the rear of the vehicle greater than the normal sprung weight thereof. When such static load is not present and the vehicle empty the main torsion bars would elevate the rear end of the vehicle above its normal riding height. Under such conditions the compensator bars 54 are torsionally adjusted in opposition to the bars 37 so as to displace the rear end of the frame downwardly and dispose it at its normal riding height. Thus, when the sprung weight of the vehicle and the predetermined additional load thereof equal the resistance of the main torsion bars, the compensator bars will be entirely unstressed. Thereafter, as the static load at the rear of the frame increases, the compensator bars may be torsionally adjusted through operation of the electric motor 63 so as to supplement the resistance of the main torsion bars and thereby increase the spring resistance so as to maintain the rear end of the vehicle at its normal riding height. The construction is such, therefore, that the compensator bars 54 may be positively torsionally adjusted in opposite directions.

The reversible electric motor 63 may be automatically actuated in response to changes in static load on the rear of the vehicle by a delayed action limit switch mechanism and wiring circuits, not shown herein, or this motor may be operated in either direction by a switch conveniently mounted on the instrument panel of the vehicle.

In the embodiment of Figs. 7 to 9 inclusive, the operation is the same as above described, the construction, however, differing in the following respects. The rear wheels 25, instead of being independently sprung, are carried by a conventional solid transverse axle 76. The rear ends of the swinging wheel levers 47 are in this instance attached to the axle 76 through the medium of flexible joints or pivotal connections 77, suitable rubber bushings being interposed at these connections to provide for limited universal movement between the rear ends of the levers 47 and the axle 76. The brace bars 51, shown in Fig. 1, are omitted in Fig. 7. In place of the single compensating torsion bar 54 in the previous embodiment there is substituted in Figs. 7 to 9 inclusive compensating torsion bar spring means comprising a number of flat torsion bar springs arranged face to face. By the use of the multiple flat torsion bars 78 it is possible to shorten materially the length thereof while still preserving the desired torsional characteristics of the longer single torsion bar 54 of the previous embodiment. The multiple flat torsion bars 78 have their front ends as a unit snugly fitting within a square socket in the rear end of the sleeve 40, as a result of which construction each torsion bar unit 78 is keyed at the forward end thereof to the inner end of the associated lever arm 43.

As illustrated in Fig. 9, the rear ends of the multiple flat torsion bars 78 have a snug sliding fit within a square socket 79 in the sleeve 55 to which the sector gear 57 is attached. Each sector gear 57 attached to the rear end of one of the compensating torsion bar units 78 is operated, as in the previous embodiment, through gearing 58, 59 and worm 61 from an individual small reversible electric motor 63. From this construction it will be seen that each set of compensating torsion bars 78 at each side of the vehicle may be individually adjusted torsionally through the medium of a separate electric motor 63 which may be controlled in the same manner as the electric motor 63 in the previous embodiment.

As illustrated in Fig. 7, for the purpose of absorbing brake and driving torque there is provided a longitudinally extending torque arm 80 rigidly secured at its rear end to the axle 76 and pivotally connected at its forward end through the medium of a flexible pivotal connection 80a to a vertical link 81 which in turn is pivotally connected at its lower end at 81a to a bracket 82 attached to one of the frame members 18. For the purpose of resisting transverse movement of the axle 76 relative to the frame there is provided a transverse track bar 83. One end of this bar has a flexible pivotal connection at 84 with a bracket 85 attached to the axle. The opposite end of this track bar 83 has a flexible pivotal connection at 86 with a bracket 87 attached to the frame member 18 at the opposite side of the vehicle. As stated above, the operation of the spring suspension in the embodiment of Figs. 7 to 9 inclusive is substantially the same as that described above in connection with the previous embodiment. It will also be understood that other than the differences in construction above described the embodiment of Figs. 7 to 9 inclusive comprehends all of the spring suspension structure shown and described with respect to the embodiment of Figs. 1 to 6 inclusive.

I claim:

1. In a spring suspension for a vehicle having a frame and front and rear longitudinally spaced wheels at one side of the frame, transversely extending lever means connected to the frame and also connected to each wheel, spring means connecting the lever means for the front wheel with the lever means for the rear wheel, said lever means acting on said spring means to cause the same to impart vertical forces in corresponding directions adjacent the front and rear of the frame in response to vertical motion of either a front or a rear wheel, and additional spring means comprising a four sided member composed of a number of flat bars arranged face to face and connected to the lever means for one wheel, and means for leveling said frame by deflecting said last named spring means in one direction or the other into various angularly adjusted positions to vary the effective spring resistance at one wheel relative to the other wheel.

2. In a spring suspension for a vehicle having a frame and front and rear wheels, vertically swingable lever means connected at its inner end to the frame and at its outer end to the front wheel, vertically swingable lever means for the rear wheel pivotally connected at its inner end to the frame, spring means common to the front and rear wheels connected to the inner ends of said lever means and extending longitudinally of the vehicle, a longitudinally extending swinging lever pivotally mounted on the frame and connected at opposite sides of its pivotal mounting to the rear wheel and to said second named lever means, the connection of said lever to said second named lever means being at a locality spaced outwardly of the pivotal connection of said second named lever means to the frame, said spring means being effective upon vertical swinging motion of either lever means to transmit vertical forces in corresponding directions to the frame at the locality of the inner ends of said lever means, compensating spring means connected to one lever means and extending substantially in line with said first named spring means, and means for deflecting said compensating spring means in varying increments to vary the spring resistance at one wheel relative to the spring resistance at the wheel at the opposite end of the vehicle thereby to compensate for varying loads on the frame.

3. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel and extending substantially in line with said first named spring means, and means for deflecting said compensating spring means to vary the spring resistance at one end of the frame relative to the opposite end.

4. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel and extending substantially in line with said first named spring means, and means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

5. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means pivotally connected to the frame intermediate its ends and operatively connecting one wheel with one of said lever means outwardly of the pivotal connection thereof to the frame and adapted to swing the same in response to vertical motion of said wheel, compensating spring means connected to one wheel and extending substantially in line with said first named spring means, and means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

6. In a spring suspension for a vehicle having a frame and front and rear wheels at a longitudinal side of the frame, swinging lever means for each wheel pivotally connected to the frame at longitudinally spaced localities, each of said lever means extending transversely of the frame and being pivotally connected at its inner end thereto, longitudinal spring means common to the front and rear wheels and connected to said lever means, longitudinal lever means pivotally connected to the frame intermediate its ends and operatively connecting one wheel with one of said lever means outwardly of the pivotal connection thereof to the frame and adapted to swing the same in response to vertical motion of said wheel, compensating spring means connected to one wheel and extending substantially in line with said first named spring means, and means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

7. In a spring suspension for a vehicle having a frame and front and rear wheels at a longitudinal side of the frame, swinging lever means for each wheel pivotally connected to the frame at longitudinally spaced localities, longitudinal spring means common to the front and rear wheels and connected to said lever means, longitudinal lever means operatively connecting one wheel with one of said lever means outwardly of the pivotal connection thereof to the frame and adapted to swing the same in response to vertical motion of said wheel, compensating spring means connected to one wheel and extending substantially in line with said first named spring means, and power actuated means for deflecting said compensating spring means to vary the spring resistance at one end of the frame relative to the opposite end, said lever means in conjunction with said longitudinal spring means being effective to impart vertical forces in corresponding directions to the front and rear of the frame in response to vertical motion of either wheel.

8. A spring suspension for a vehicle having a frame and front and rear wheels, comprising swinging lever means for each wheel arranged at longitudinally spaced localities, longitudinal spring means common to the front and rear wheels and connected to said lever means and effective in conjunction therewith to transmit vertical forces in corresponding directions to the front and rear of the frame in response to vertical motion of either wheel, load compensating spring means connected to the rear wheel and disposed rearwardly of said longitudinal spring means, and means for deflecting said compensating spring means and for increasing by fixed increments according to load changes the spring resistance at the rear of the frame effective to raise the rear of the frame relative to the front of the frame.

9. A spring suspension for a vehicle having a frame and front and rear wheels comprising swinging lever means for each wheel pivotally connected to the frame at longitudinally spaced localities, longitudinal spring means common to the front and rear wheels and connected to said lever means and effective in conjunction therewith to transmit vertical forces in corresponding directions to the front and rear of the frame in response to vertical motion of either wheel, compensating spring means connected to the rear wheel and disposed substantially in alignment with said longitudinal spring means, and means for deflecting said compensating spring means to vary the spring resistance at the rear of the frame relative to the front of the frame.

10. A structure according to claim 6 in which the compensating spring means comprises torsional spring means.

11. In a spring suspension for a vehicle having a frame and front and rear wheels at one longitudinal side thereof, lever means connected to each wheel and also connected to the frame at longitudinally spaced localities, torsional spring means connecting said lever means and effective to transmit vertical forces in corresponding directions to the frame at said localities in response to vertical motion of either wheel, and compensating torsional spring means connected to one lever means for varying the spring resistance adjacent one end of the frame thereby to compensate for varying load conditions, said lever means for the front and rear wheels extending transversely from the first named torsional spring means in corresponding directions, both of said torsional spring means at one side of the vehicle extending substantially in alignment and said one lever means being connected to adjacent ends of said first and second named torsional spring means.

12. In a spring suspension for a vehicle having a frame and front and rear wheels at one longitudinal side thereof, lever means connected to each wheel and also connected to the frame at longitudinally spaced localities, torsional spring means connecting said lever means and effective to transmit vertical forces in corresponding directions to the frame at said localities in response to vertical motion of either wheel, and compensating torsional spring means connected to one lever means for varying the spring resistance adjacent one end of the frame thereby to compensate for varying load conditions, both of said torsional spring means at one side of the vehicle extending substantially in alignment, and means operatively connected to said compensating spring means and acting thereon to deflect the same in response to static load changes.

13. In a spring suspension for a vehicle having a frame and front and rear wheels at one longitudinal side thereof, lever means connected to each wheel and also connected to the frame at longitudinally spaced localities, torsional spring means connecting said lever means and effective to transmit vertical forces in corresponding directions to the frame at said localities in response to vertical motion of either wheel, and compensating torsional spring means connected to one lever means for varying the spring resistance adjacent one end of the frame thereby to compensate for varying load conditions, said lever means for the front and rear wheels extending transversely from the first named torsional spring means in corresponding directions and both of said torsional spring means at one side of the vehicle extending substantially in alignment, and means operatively connected to said compensating spring means and acting thereon to deflect the same in response to static load changes.

14. In a spring suspension for a vehicle having a frame and front and rear wheels at one longitudinal side thereof, lever means connected to each wheel and also connected to the frame at longitudinally spaced localities, torsional spring means connecting said lever means and effective to transmit vertical forces in corresponding directions to the frame at said localities in response to vertical motion of either wheels, and compensating torsional spring means connected to one lever means for varying the spring resistance adjacent one end of the frame thereby to compensate for varying load conditions, both of said torsional spring means at one side of the vehicle extending substantially in alignment, the connection between said one lever means and the wheel comprising a longitudinally extending lever pivotally connected intermediate its ends to the frame.

15. In a spring suspension for a vehicle having a frame and front and rear wheels at one longitudinal side thereof, lever means connected to each wheel and also connected to the frame at longitudinally spaced localities, torsional spring means connecting said lever means and effective to transmit vertical forces in corresponding directions to the frame at said localities in response to vertical motion of either wheel, and compensating torsional spring means connected to one lever means for varying the spring resistance adjacent one end of the frame thereby to compensate for varying load conditions, both of said torsional spring means at one side of the vehicle extending substantially in alignment, and means operatively connected to said compensating spring means and acting thereof to deflect the same in response to static load changes, the connection between said one lever means and the wheel comprising a longitudinally extending lever pivotally connected intermediate its ends to the frame.

16. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel and extending substantially in alignment with said spring suspension, power actuated means, and means operatively connecting said power actuated means to said load compensating spring means and acting on the latter to deflect the same thereby to vary the spring resistance at one end of the vehicle structure.

17. A structure as set forth in claim 16 in which said spring suspension and compensating spring means each includes torsional spring means.

18. A structure as set forth in claim 16 in which the connection between said load compensating spring means and wheel comprises swinging lever means also connected to said spring suspension.

19. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel, power actuated means, and means operatively connecting said power actuated means to said load compensating spring means and acting on the latter to deflect the same thereby to vary the spring resistance at one end of the vehicle structure, said separate means for operatively connecting the suspension to the rear wheel comprising swingable axle means pivotally mounted inwardly of the wheel and a vertically swingable lever arm connected to said axle means.

20. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel, power actuated means, means operatively connecting said power actuated means to said compensating spring means and acting on the latter to deflect the same thereby to vary the spring resistance at one end of the vehicle structure, the connection between said suspension and the rear wheel including a longitudinally extending lever fulcrumed intermediate its ends on the vehicle structure and also connected to the compensating spring means.

References Cited in the file of this patent

UNITED STATES PATENTS

| | | |
|---|---|---|
| 1,396,549 | Beatty | Nov. 8, 1921 |
| 2,191,211 | Krotz | Feb. 20, 1940 |
| 2,577,761 | Hickman | Dec. 11, 1951 |

FOREIGN PATENTS

| | | |
|---|---|---|
| 45,963 | France | Jan. 8, 1936 |